April 2, 1957          J. R. HOLLINS          2,787,779

LIGHTING AND SIGNALLING SYSTEM FOR AUTOMOTIVE VEHICLES

Filed Sept. 21, 1953          2 Sheets-Sheet 1

INVENTOR
Jesse R Hollins
BY
ATTORNEY

United States Patent Office 2,787,779
Patented Apr. 2, 1957

2,787,779
LIGHTING AND SIGNALLING SYSTEM FOR AUTOMOTIVE VEHICLES

Jesse R. Hollins, Brooklyn, N. Y.

Application September 21, 1953, Serial No. 381,163

8 Claims. (Cl. 340—81)

This invention relates to lighting and signalling systems for automotive vehicles and, more particularly, to a novel combined headlamp and emergency signal control switch.

Modern automotive vehicles are equipped with a two-position headlamp control switch, for controlling the usual front and rear mounted driving lamps, and usually with sepaarte switch means for controlling turn direction signalling lamps, in one "on" position of the headlamp control switch, the tail lamps, license plate lamp or lamps, and the front mounted parking lamps are illuminated. In the other "on" position, the parking lamps are extinguished and the head lamps are illuminated.

A direction signal control switch is generally provided for selectivity flashing left and right mounted lamps to signal a proposed turn. The directional signal lamps may be units separate from the parking and tail or stop lamps or may be mounted in the same lamp compartments with the latter. In some cases, dual filament lamps are provided, with one filament, usually the brighter, providing the directional signal and the other the steady-burning driving lamp.

In prior applications and patents, I have disclosed novel "flare" switch arrangements whereby signal lamps on a vehicle may be simultaneously flashed, in synchronism or in alternation, to give warning of an emergency stopping or parking of the vehicle. Such arrangements have usually been incorporated in, or wired in combination with, the directional signalling switch.

The present invention is directed to a novel emergency signalling arrangement wherein the "flare switch" is incorporated with the headlamp control switch in a single unit arrangement. The usual two "on" position headlamp control switch is replaced by a control switch having a "neutral" or "off" position and four "on" positions. Two "on" positions are provided on either side of the neutral position.

The two positions to one side of "neutral" provide the usual headlamp circuit connections, one being the "parking lamp" position and the other the "headlamp" position. In the first position to the other side of "neutral," all the signal lamps are flashed and the license plate lamp means is steadily illuminated. In the second "flare" position, the same occurs but the headlamps are also illuminated to provide light for tire changing, emergency repairs, etc. The flasher for the "flare" position is connected to the normally live contact of the ignition switch, so that the "flare" signals are operative when the ignition switch is open. Also, a separate connection is made to the ammeter or the normally open contact of the ignition switch for steadily illuminating the license plate lamp in both "flare" positions and the headlamps in one "flare" position.

For an understanding of the invention arrangement, reference is made to the following description of a typical embodiment thereof as illustrated in the accompanying drawings.

Figure 1:
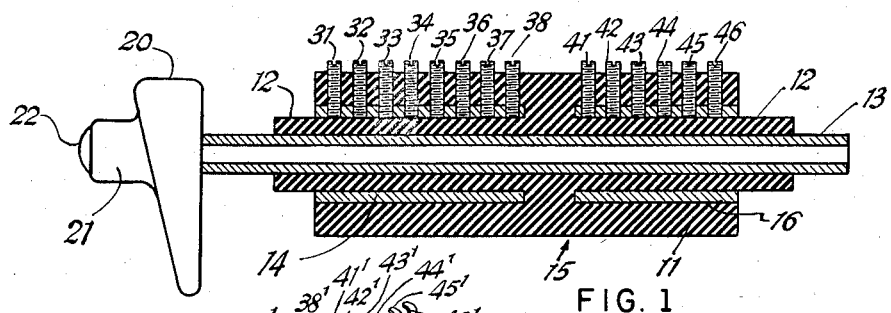
Fig. 1 is an axial sectional view through a drum of one form of switch embodying the invention.
Figure 2:
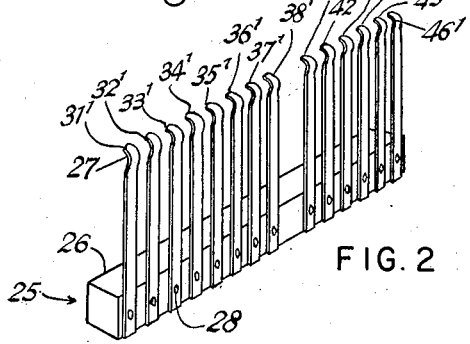
Fig. 2 is a perspective view of a contact finger arrangement utilized with the drum of Fig. 1.

Referring to Figs. 1 and 2, a drum switch 10 embodying the invention, and which may be substituted for the usual headlamp control switch is illustrated as incorporating a drum 15 and a contact finger arrangement 25 cooperable with drum 15. Drum 15 includes a cylinder 11 of dielectric material formed with reduced ends 12, 12 forming bearings or mountings. A tube 13 extending in fixed coaxial relation through cylinder 11 to form a conduit or conductor. Set into each end of cylinder 11 are sleeves 14, 16 of conductive material, the inner ends of the sleeves being spaced and sleeve 14 being somewhat longer than sleeve 16. The outer ends of sleeves 14 and 16 are substantially flush with the ends of dielectric cylinder 11.

The outer end of central tube 13 serves to mount the control knob 20 for switch 10. This control knob is recessed to receive a bayonet type lamp socket 21, which may be mounted on tube 13 and received a "flare" pilot lamp FP. A suitable lens 22 may close the outer end of the lamp recess in knob 20.

Drum 15 carries two sets of contacts, 31—38 and 41—46, cooperable with contact finger arrangement 25. These contacts may be threaded radially through cylinder 11 into engagement with sleeves 14 and 16, respectively. The contacts project equal distances radially from sleeve 11. Contact group 31—38, which may be termed the "headlamp control" group, includes eight (8) contacts, and the "flare" contact group 41—46 includes six (6) contacts. As will be described more fully hereinafter, the contact positions of each group are uniformly spaced axially of cylinder 11 and, at each axial position, there are five (5) contact locations in the same diametric plane spaced uniformly over 180° of the arcuate surface of sleeve 11, the locations being at 45° intervals. All of the contact locations are not occupied, the contacts being arranged in a pre-set pattern as indicated in Figs. 3 and 4.

The contact finger arrangement 25 (Fig. 2) includes two sets of spring metal fingers 31'—38' and 41'—46' mounted on a dielectric block 26. The fingers are spaced longitudinally of block 26 to conform to the axial spacing of the contact positions on drum 15. Each finger has a curved free end 27 and is secured to block 26 by a rivet 28 acting as a terminal for circuit connections.

Figure 4:
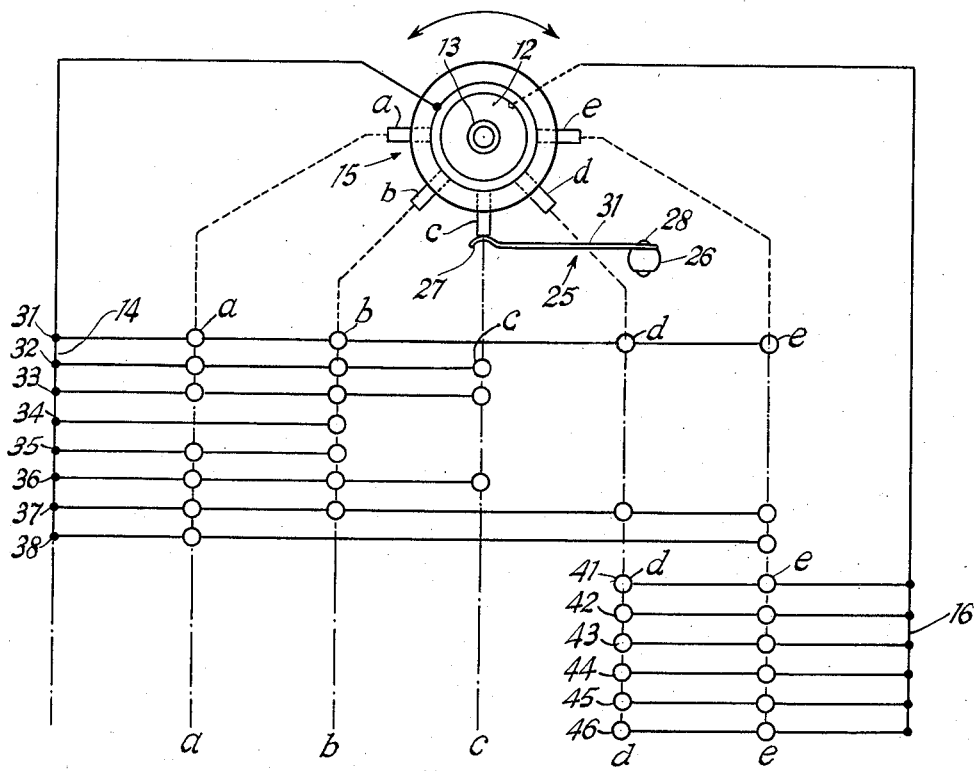
Fig. 4 is a development of the drum switch.
Figure 3:
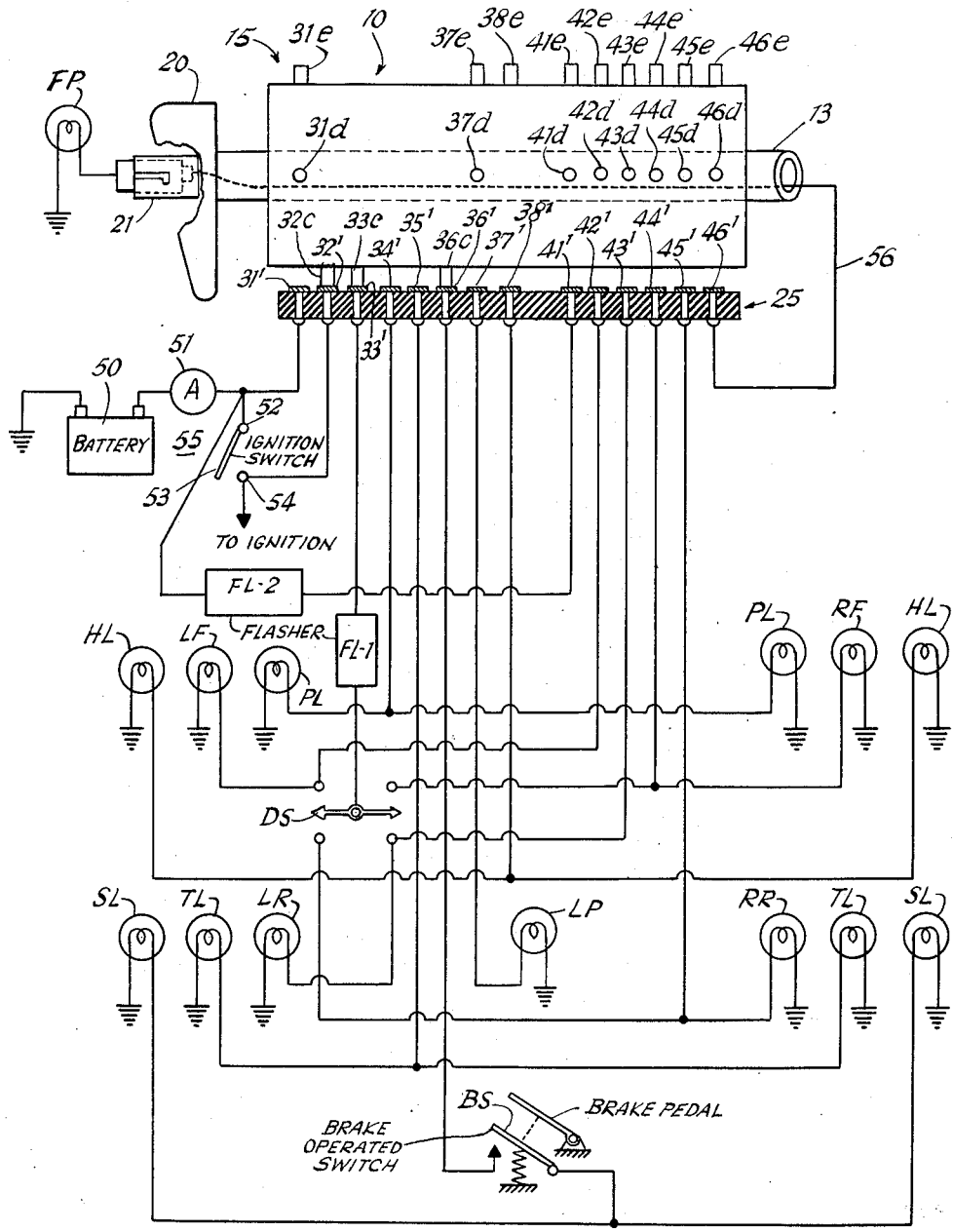
Fig. 3 is a part axial sectional view and part schematic wiring diagram of the invention signalling arrangement, the drum switch being illustrated in the "neutral" position.

Figs. 3 and 4 illustrate the circuit connections to the lamps and the development of drum 15. In Fig. 4, the contacts in the "headlamp" position are labelled "a," those in the "parking lamp" position "b," those in the "off" or "neutral" position "c," those in the first "flare" position "d," and those in the second "flare" position "e." Corresponding designations are used in Fig. 3.

Referring to Fig. 3, the usual grounded vehicle battery 50 is connected through ammeter 51 to "live" terminal 52 of ignition switch 55. Switch 55 has a contact arm 53 selectively engageable with normally open contact 54. In the usual manner, the vehicle has a pair of front-mounted headlamps HL and front-mounted parking lamps PL. Also, the lamp arrangement includes the usual tail lamps TL, license plate illuminating lamp or lamps LP, and stop lamps SL controlled by brake pedal operated switch BS.

The vehicle is further equipped with twin direction signalling lamps LF, RF, LR, and RR under the control of direction signalling switch DS, usually mounted on the steering column. The direction lamp circuit includes a flasher FL-1 for flashing the selectively energized left lamps LF and LR, or right lamps RF and RR. These signal lamps may be separate units, may be mounted in the parking or tail lamp compartments, or may be the added filament of dual filament lamps. The invention is applicable to all three of these known arrangements.

In accordance with the invention, ammeter 51 is connected to contact finger 31′ which engages contacts 31a and 31b in the "headlamps on," "parking lamp on" and "off" positions of switch 10, and contacts 31d and 31c in the two "flare" positions of switch 10. Thus, in these four positions, sleeve 14 is connected to battery 50. Normally open contact 54 of ignition switch 55 is connected to finger 32′ which engages contacts 32a, 32b and 32c in the "headlamps on," "parking lamps on" and "off" positions of switch 10, for a purpose to be described. Direction switch DS is connected to finger 33′ through flasher FL-1. This finger engages contacts 33a, 33b, and 33c, so that switch DS is operative to selectively flash lamps LF and LR or RF and RR in the headlamp and parking lamp positions of switch 10, whether ignition switch 55 is open or closed, and in the "off" position of switch 10 when ignition switch 55 is closed. There are no contacts 33 in the two flare positions (d, e) of the switch 10, so that switch DS is ineffective when switch 10 is in either flare position.

The parking lamps PL are connected in parallel to finger 34′, which engages a contact 34b only in the parking lamp position of switch 10. Tail lamps TL are connected to finger 35′ engageable with contacts 35a or 39b, so that the tail lamps are energized in either the headlamp or parking lamp position of switch 10.

The stop lamps SL are connected in parallel, through brake operated switch BS, to finger 36′. This finger engages only contacts 36a, 36b and 36c, so that switch BS is ineffective to control lamps SL in either flare position of switch 10. License plate lamp LP is connected to finger 37′ engageable with any of four contacts 37a, 37b, 37d, or 37e. Lamp LP is thus illuminated in any "on" position of switch 10 so that the license plate is illuminated whenever the vehicle night-driving or the flare lamps are turned on. Head lamps HL are connected in parallel to finger 38′ engageable with either contact 38a, in the "headlamp on" position, or contact 38e, in the second "flare" position.

A second flasher FL-2 is connected between the live ignition switch contact 52 and finger 41′. Thus sleeve 16 is connected to battery 50 through flasher FL-2 and ammeter 51, whether ignition switch 55 is open or closed. The finger 35 connected to ammeter 51 in shunt with flasher FL-2, provides for steady illumination of lamp LP in switch position "d" and "e" and of headlamps HL in switch position "e."

Fingers 42′ through 45′ are respectively individually connected to signal lamps LF, RG, LR and RR. Each of these fingers is engageable with a contact 42d—45d or 42e—45e in either of the "flare" positions of switch 10. Finger 46′ is connected by a conductor 56 to flare pilot lamp FP, and is engageable with either of a pair of contacts 46d or 46e.

With the foregoing description, the operation of the invention will be understood best by reference to Figs. 3 and 4, and more particularly to Fig. 2. In the latter figure, the drum 15 is shown in the "c" or "off" position, so that the fingers of arrangement 25 are engaged only with contacts in the "c" position. By reference to the drum development of Fig. 4, it will be noted that only contacts 32c, 33c and 36c are engaged with their respective contacts in this position. Thus, the direction switch DS and the brake operated switch BS are connected to battery 50 only if ignition switch 55 is closed, so that the direction signal lamps and stop lamps can be energized only if the vehicle engine is energized.

If the switch 10 is now turned counter-clockwise to parking lamp position "b," contacts 31b through 37b are in circuit. Thus, in addition to the turn and stop lamps being in effective control of switches DS and BS, parking lamps PL, tail lamps TL, and license plate lamps LP are illuminated.

In the "headlamps on," or "a" position of switch 10, contacts 31a, 32a, 33a, and 35a—38a are in circuit. Thus, the turn and stop lamps are still under control of switches DS and BS, the headlamps, tail lamps, and license plate lamps are illuminated, and the parking lamps PL are extinguished. Thus, in either position "a" or position "b," switch 10 functions in the same manner as the usual headlamp control switch.

For an emergency stop or emergency parking, after dark, switch 10 is turned clockwise to either flare position "d" or "e." In either flare position, contacts 41d—46d or 41e—46e are engaged with their respective contacts. Thus, through the circuit connections described, all four signal lamps LF, RF, LR, and RR, and flare pilot lamp FP are connected to battery 50 through flasher FL-2, and thus are flashed. Also, license plate lamp LP is connected to ammeter 51 through contacts 31d, 31e, 37d or 37e, in both flare positions, to be steadily illuminated. At the same time, stop lamps SL and tail lamps TL are effectively cut out of circuit. Thus, there will be no steady burning rear lamps, except the license plate lamp LP, to confuse the emergency signalling effect. Illumination of the license plate at all times after dark is required by law, so that lamp LP must be kept energized in all "on" positions of switch 10.

The parking lamps PL are also disconnected in both flare positions. However, it is sometimes desirable to have illumination at the front of the car for changing tires, making emergency repairs, etc. Hence, in the "e" position of switch 10, headlamps HL are connected to ammeter 51 through contacts 31e and 38e, thus being steadily illuminated in this position.

The invention thus provides a novel switch and emergency signal lamp arrangement in which the general lighting control and emergency stop signal control are combined in a single switch unit which replaces the usual headlamp control switch. This greatly simplifies the installation of emergency signalling systems on automotive vehicles.

While a specific embodiment of the invention has been described in detail to illustrate the application of the invention principles, it will be understood that the invention may be embodied otherwise without departing from such principles.

What is claimed is:

1. For use in a vehicle having a source of electric energy, an ignition switch having a live contact connected to said source and a normally open contact, head lamps, parking lamps, tail lamps, stop lamps, a brake-operated switch in series with said stop lamps, license plate lamp means, turn direction signal lamps on each side of the vehicle at each end thereof, a first flasher, and a direction signal switch selectively operable to connect the signal lamps on either side of the vehicle to said first flasher; the combination comprising a second flasher connected to said source; and a control switch in circuit connection with said source, said normally open contact, said flashers, said brake-operated switch, said lamps, and said lamp means; said control switch having an off position, a parking lamps on positions, a head lamps on position and a flare position, said control switch in the off position, connecting said brake-operated switch and said first flasher to said normally open contact, said control switch, in the parking lamps on position, connecting said brake-operated switch, said first flasher, said tail lamps, said license plate lamp means, and said parking lamps to said source; said control switch, in the headlamps on position, connecting said brake-operated switch, said first flasher, said tail lamps, said license plate lamp means, and said head lamps to said source; said control switch in the flare position, connecting said signal lamps directly to said second flasher for flashing of all of said signal lamps.

2. For use in a vehicle having a source of electric energy, an ignition switch having a live contact connected to said source and a normally open contact, head lamps, parking lamps, tail lamps, stop lamps, a brake-operated switch in series with said stop lamps, license plate lamp means, turn direction signal lamps on each side of the vehicle at each end thereof, a first flasher, and a direction signal switch selectively operable to connect the signal lamps on either side of the vehicle to said first flasher; the combination comprising a second flasher connected to said source; and a control switch in circuit connection with said source, said normally open contact, said flashers, said brake-operated switch, said lamps, and said lamp means; said control switch having an off position, a parking lamps on position, a head lamps on position and a flare position; said control switch, in the off position, connecting said brake-operated switch and said first flasher to said normally open contact; said control switch, in the parking lamps on position, connecting said brake-operated switch, said first flasher, said tail lamps, said license plate lamp means, and said parking lamps to said source; said control switch, in the head lamps on position, connecting said brake-operated switch, said first flasher, said tail lamps, said license plate lamp means, and said head lamps to said source; said control switch, in the flare position, connecting said signal lamps directly to said second flasher, and said license plate lamp means to said source for flashing of all of said signal lamps and steady illumination of said license plate lamp means.

3. For use in a vehicle having a source of electric energy, an ignition switch having a live contact connected to said source and a normally open contact, head lamps, parking lamps, tail lamps, stop lamps, a brake-operated switch in series with said stop lamps, license plate lamp means, turn direction signal lamps on each side of the vehicle at each end thereof, a first flasher, and a direction signal switch selectively operated to connect the signal lamps on either side of the vehicle to said first flasher; the combination comprising a second flasher connected to said source; and a control switch in circuit connection with said source, said normally open contact, said flasher, said brake-operated switch, said lamps, and said lamp means; said control switch having an off position, a parking lamps on position, a head lamps on position and a flare position; said control switch, in the off position, connecting said brake-operated switch and said first flasher to said normally open contact; said control switch, in the parking lamps on position, connecting said brake-operated switch, said first flasher, said tail lamps, said license plate lamp means, and said parking lamps to said source; said control switch, in the flare position, connecting said signal lamps directly to said second flasher, and said license plate lamp means and said head lamps to said source for flashing of all of said signal lamps and steady illuminating of said license plate lamp means and said head lamps.

4. For use in a vehicle having a source of electric energy, an ignition switch having a live contact connected to said source and a normally open contact, head lamps, parking lamps, tail lamps, stop lamps, a brake-operated switch in series with said stop lamps, license plate lamp means, turn direction signal lamps on each side of the vehicle at each end thereof, a first flasher, and a direction signal switch selectively operable to connect the signal lamps on either side of the vehicle to said first flasher; the combination comprising a second flasher connected to said source; and a control switch in circuit connection with said source, said normally open contact, said flashers, said brake-operated switch, said lamps, and said lamp means; said control switch having an off position, a parking lamps on position, a head lamps on position, a first flare position, and a second flare position; said control switch, in the off position, connecting said brake-operated switch and said first flasher to said normally open contact; said control switch, in the parking lamps on position, connecting said brake-operated switch, said first flasher, said tail lamps, said license plate lamp means, and said parking lamps to said source; said control switch, in the headlamps on position, connecting said brake-operated switch, said first flasher, said tail lamps, said license plate lamp means, and said head lamps to said source; said control switch, in the first flare position, connecting said signal lamps directly to said second flasher for flashing of all said signal lamps; said control switch, in the second flare position, connecting said signal lamps directly to said second flasher and said head lamps to said source for flashing of all of said signal lamps and steady illumination of said headlamps.

5. For use in a vehicle having a source of electric energy, an ignition switch having a live contact connected to said source and a normally open contact, head lamps, parking lamps, tail lamps, stop lamps, a brake-operated switch in series with said stop lamps, license plate lamp means, turn direction signal lamps on each side of the vehicle at each end thereof, a first flasher, and a direction signal switch selectively operable to connect the signal lamps on either side of the vehicle to said first flasher; the combination comprising a second flasher connected to said source; and a control switch including two sets of fixed contact fingers and a contact-carrying member movable relative to said fingers and incorporating two sets of interconnected contacts, each set of interconnected contacts being cooperable with a different set of fingers; the contact fingers of one set being in circuit connection with said source, said normally open ignition switch contact, said first flasher, said brake-operated switch, said headlamps, said parking lamps, said tail lamps, and said license plate lamp means; the contact fingers of the other set being in circuit connection with said second flasher, and said signal lamps; said member being movable between an off position, a parking lamps on position, a headlamps on position, and a flare position; said control switch, in the off position, connecting said brake-operated switch and said first flasher to said normally open ignition switch contact; said control switch, in the parking lamps on position, connecting said brake-operated switch, said first flasher, said tail lamps, said license plate lamp means, and said parking lamps to said source; said control switch, in the headlamps on position, connecting said brake-operated switch, said first flasher, said tail lamps, said license plate lamp means, and said head lamps to said source; said control switch in the flare position, connecting said signal lamps directly to said second flasher for flashing of all of said signal lamps.

6. For use in a vehicle having a source of electric energy, an ignition switch having a live contact connected to said source and a normally open contact, head lamps, parking lamps, tail lamps, stop lamps, a brake-operated switch in series with said stop lamps, license plate lamp means, turn direction signal lamps on each side of the vehicle at each end thereof, a first flasher, and a direction signal switch selectively operable to connect the signal lamps on either side of the vehicle to said first flasher; the combination comprising a second flasher connected to said source; a control switch including two sets of fixed contact fingers and a contact-carrying member movable relative to said fingers and incorporating two sets of interconnected contacts, each set of interconnected contacts being cooperable with a different set of fingers; and a flare pilot lamp; the contact fingers of one set being in circuit connection with said source, said normally open ignition switch contact, said first flasher, said brake-operated switch, said headlamps, said parking lamps, said tail lamps, and said license plate lamp means; the contact fingers of the other set being in circuit connection with said second flasher; said signal lamps, and said flare pilot lamp; said member being movable between an off position, a parking lamps on position, a headlamps on position and a flare position; said control switch, in the off position, connecting said brake-operated switch and said first flasher to said normally open ignition switch contact; said control switch, in the parking lamps on position, connecting said brake-operated switch, said first flasher, said tail lamps, said license plate lamp means, and said parking lamps to said source; said control switch, in the headlamps on position, connecting said brake-operated switch, said first flasher, said tail lamps, said license plate lamp means, and said head lamps to said source; said control switch, in the flare position, connecting said signal lamps and said pilot lamp directly to said second flasher for flashing of all of said signal lamps and said flare pilot lamp.

7. For use in a vehicle having a source of electric energy, an ignition switch having a live contact connected to said source and a normally open contact, head lamps, parking lamps, tail lamps, stop lamps, a brake-operated switch in series with said stop lamps, license plate lamp means, turn direction signal lamps on each side of the vehicle at each end thereof, a first flasher, and a direction signal switch selectively operable to connect the signal lamps on either side of the vehicle to said first flasher; the combination comprising a second flasher connected to said source; a control switch including two sets of fixed contact fingers and a contact-carrying member movable relative to said fingers and incorporating two sets of interconnected contacts, each set of interconnected contacts being cooperable with a different set of fingers; and a flare pilot lamp; the contact fingers of one set being in circuit connection with said source, said normally open ignition switch contact, said first flasher, said brake-operated switch, said headlamps, said parking lamps, said tail lamps, said normally open ignition switch contact, and said license plate lamp means; the contact fingers of the other set being in circuit connection with said second flasher, said signal lamps, and said flare pilot lamps; said member being movable between an off position, a parking lamps on position, a headlamps on position, a first flare position, and a second flare position; said control switch, in the off position, connecting said brake-operated switch and said first flasher to said normally open ignition switch contact; said control switch, in the parking lamps on position, connecting said brake-operated switch, said first flasher, said tail lamps, said license plate lamp means, and said parking lamps to said source; said control switch, in the headlamps on position, connecting said brake-operated switch, said first flasher, said tail lamps, said license plate lamp means, and said head lamps to said source; said control switch in the first flare position, connecting said signal lamps and said pilot lamp directly to said second flasher and said license plate lamp means to said source for flashing of all of said signal lamps and said flare pilot lamp and steady illumination of said license plate lamp means and said head lamps.

8. For use in a vehicle having a source of electric energy, an ignition switch having a live contact connected to said source and a normally open contact, head lamps, parking lamps, tail lamps, stop lamps, a brake-operated switch in series with said stop lamps, license plate lamp means, turn direction signal lamps on each side of the vehicle at each end thereof, a first flasher, and a direction signal switch selectively operable to connect the signal lamps on either side of the vehicle to said first flasher; the combination comprising a second flasher connected to said source; a control switch including two sets of fixed contact fingers and a contact-carrying drum rotatable relative to said fingers and incorporating two sets of interconnected contacts, each set of interconnected contacts being cooperable with a different set of fingers; and a flare pilot lamp, the contact fingers of one set being in circuit connection with said source, said normally open ignition switch contact, said first flasher, said brake-operated switch, said headlamps, said parking lamps, said tail lamps, said normally open ignition switch contact, and said license plate lamp means; the contact fingers of the other set being in circuit connection with said second flasher, said signal lamps, and said flare pilot lamp; said drum being rotatable between an off position, a parking lamps on position, a headlamps on position, a first flare position, and a second flare position; said control switch, in the off position, connecting said brake-operated switch and said first flasher to said normally open ignition switch contact; said control switch, in the parking lamps on position, connecting said brake-operated switch, said first flasher, said tail lamps, said license plate lamp means, and said parking lamps to said source; said control switch, in the headlamps on position, connecting said brake-operated switch, said first flasher, said tail lamps, said license plate lamp means, and said head lamps to said source; said control switch, in the first flare position, connecting said signal lamps and said pilot lamp directly to said second flasher and said license plate lamps means to said source for flashing of all of said signal lamps and said flare pilot lamp and steady illumination of said license plate lamp means, said control switch, in the second flare position, connecting said signal lamps and said pilot lamps directly to said first flasher and said license plate lamp means and said headlamps to said source for flashing of all of said signal lamps and said pilot lamp and steady illumination of said license plate means and said head lamps.

References Cited in the file of this patent

UNITED STATES PATENTS

| | | |
|---|---|---|
| 810,536 | Holzer | Jan. 23, 1906 |
| 1,622,932 | Warburton | Mar. 29, 1927 |
| 2,010,741 | Sullender | Aug. 6, 1935 |
| 2,087,935 | Batcheller | July 27, 1937 |
| 2,321,803 | Falge | June 15, 1943 |
| 2,667,602 | Flemming | Jan. 26, 1954 |
| 2,672,531 | Stevenson | Mar. 16, 1954 |